US012654844B2

(12) United States Patent
Roach et al.

(10) Patent No.: US 12,654,844 B2
(45) Date of Patent: Jun. 16, 2026

(54) VEHICLE BASED OPTIMIZATION SYSTEM AND METHOD THEREFOR

(71) Applicant: GADFIN LTD., Rehovot (IL)

(72) Inventors: Robert Roach, Ramat Hasharon (IL); Eyal Regev, Mazkeret-Batya (IL)

(73) Assignee: GADFIN LTD., Rehovot (IL)

( * ) Notice: Subject to any disclaimer, the term of this patent is extended or adjusted under 35 U.S.C. 154(b) by 117 days.

(21) Appl. No.: 18/034,892

(22) PCT Filed: Nov. 4, 2021

(86) PCT No.: PCT/IL2021/051310
§ 371 (c)(1),
(2) Date: May 2, 2023

(87) PCT Pub. No.: WO2022/097144
PCT Pub. Date: May 12, 2022

(65) Prior Publication Data
US 2024/0010326 A1      Jan. 11, 2024

(30) Foreign Application Priority Data

Nov. 5, 2020    (IL) .......................................... 278514

(51) Int. Cl.
*B64C 13/16*          (2006.01)
*B64C 27/54*          (2006.01)
(52) U.S. Cl.
CPC .............. *B64C 13/16* (2013.01); *B64C 27/54* (2013.01)
(58) Field of Classification Search
CPC ................................ B64C 13/16; B64C 27/54
(Continued)

(56) References Cited

U.S. PATENT DOCUMENTS 5,183,384 A        2/1993   Trumbly
6,092,007 A  *    7/2000   Cotton ................. G05D 1/0204
                                                                    701/4
(Continued)

FOREIGN PATENT DOCUMENTS

EP            3623288 A1      3/2020
WO      WO-2018232196 A1  * 12/2018   ............. B64C 13/16
WO      WO-2020141513 A2  *  7/2020   ......... B64C 29/0033

OTHER PUBLICATIONS

International Search Report for PCT/IL2021/051310; mailed Nov. 30, 2021 (3 pages).
(Continued)

*Primary Examiner* — Helal A Algahaim
(74) *Attorney, Agent, or Firm* — Roach Brown McCarthy & Gruber, P.C.; Kevin D. McCarthy

(57)            ABSTRACT

In conjunction with a system and method for optimizing mission conditions of a vehicle, one or more control surfaces movably mounted on a buoyancy-influenced vehicle and configured to maintain stable vehicular movement through a corresponding medium being navigated by the vehicle are individually, controllably and differentially displaced until an optimal position for each of the control surfaces that is collectively suitable to achieve optimum mission conditions is established. In one embodiment, a method for reducing drag induced by a propeller of a propeller-bearing aircraft during forward flight comprises rotating a propeller having one or two blades, when inactive, to an optimal drag-minimizing stowing angle which is angularly spaced from a forward direction of flight of the aircraft.

20 Claims, 10 Drawing Sheets

(58) Field of Classification Search
USPC ............................................................ 701/4
See application file for complete search history.

(56) References Cited

U.S. PATENT DOCUMENTS

| | | | | |
|---|---|---|---|---|
| 8,376,264 | B1 | 2/2013 | Hong et al. | |
| 9,227,721 | B1 * | 1/2016 | Nguyen | B64C 3/50 |
| 10,780,974 | B2 * | 9/2020 | Benson | B64C 27/30 |
| 2017/0341740 | A1 | 11/2017 | Vander Lind et al. | |
| 2019/0263515 | A1 * | 8/2019 | Karem | B64D 27/026 |
| 2021/0109547 | A1 * | 4/2021 | Clark | G05D 1/0816 |

OTHER PUBLICATIONS

Written Opinion of the International Searching Authority for PCT/
IL2021/051310; mailed Nov. 30, 2021 (5 pages).

* cited by examiner

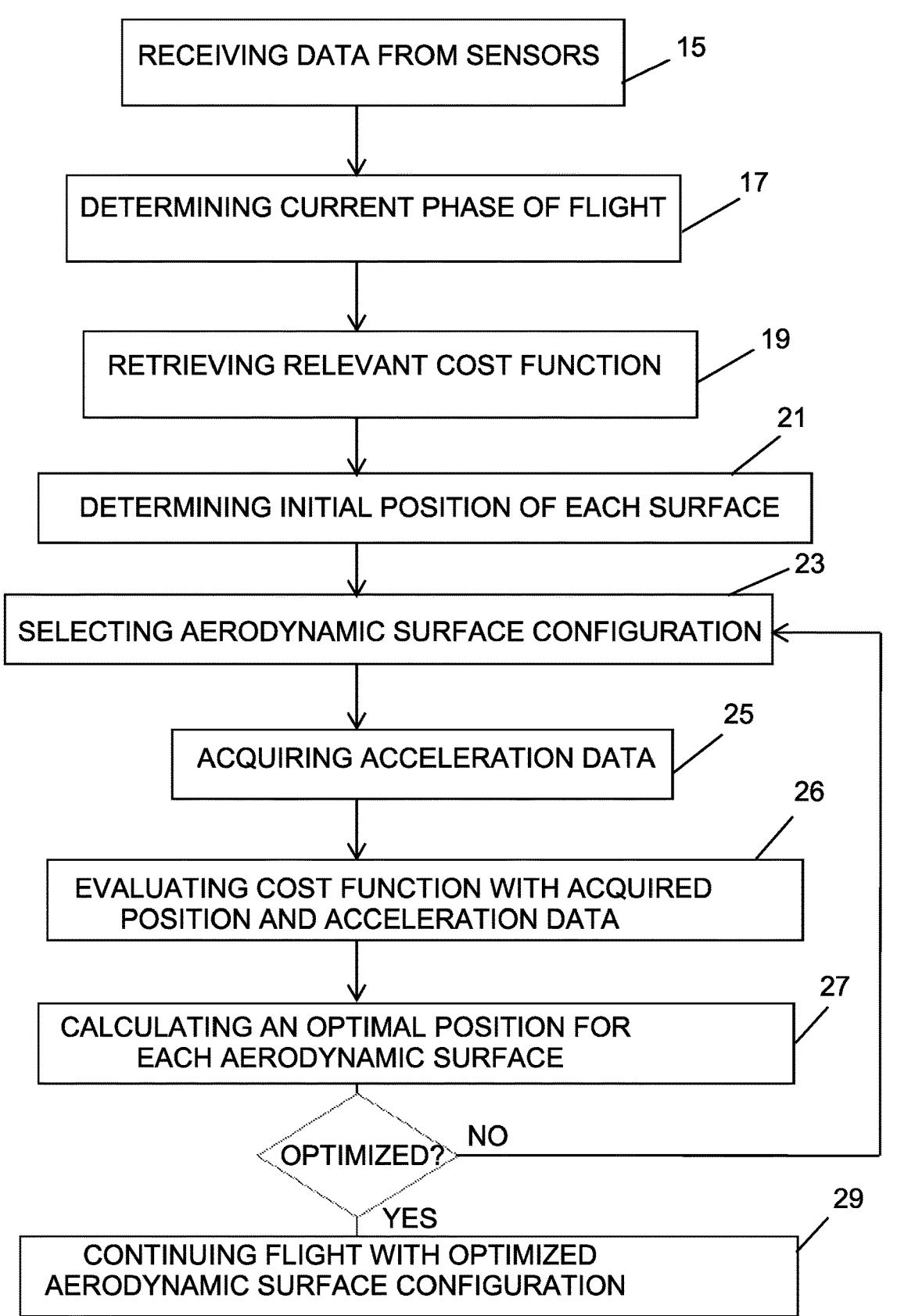

RECEIVING DATA FROM SENSORS — 15

DETERMINING CURRENT PHASE OF FLIGHT — 17

RETRIEVING RELEVANT COST FUNCTION — 19

DETERMINING INITIAL POSITION OF EACH SURFACE — 21

SELECTING AERODYNAMIC SURFACE CONFIGURATION — 23

ACQUIRING ACCELERATION DATA — 25

EVALUATING COST FUNCTION WITH ACQUIRED POSITION AND ACCELERATION DATA — 26

CALCULATING AN OPTIMAL POSITION FOR EACH AERODYNAMIC SURFACE — 27

OPTIMIZED?     NO

YES

CONTINUING FLIGHT WITH OPTIMIZED AERODYNAMIC SURFACE CONFIGURATION — 29

Fig. 2A

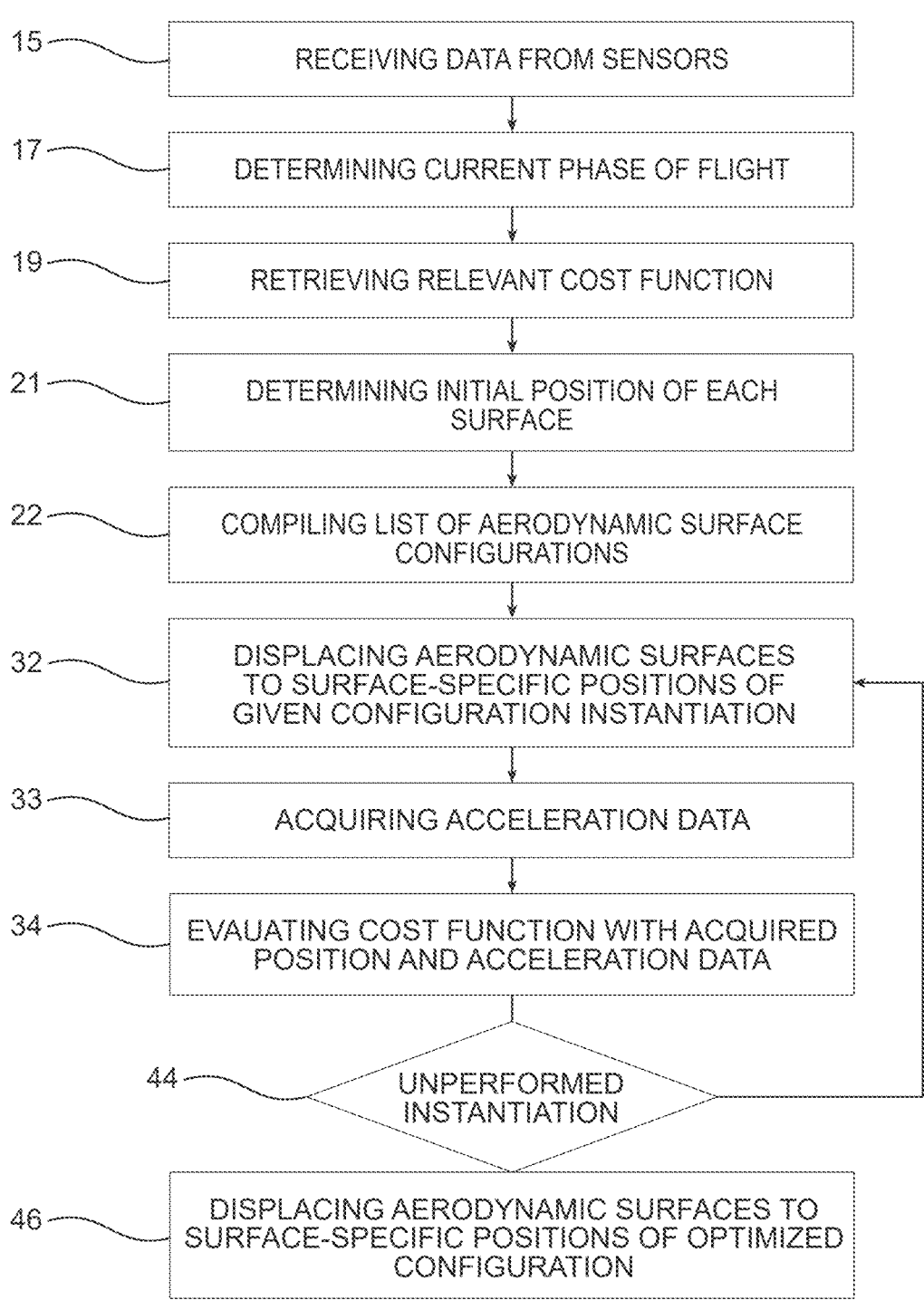

15 ── RECEIVING DATA FROM SENSORS

17 ── DETERMINING CURRENT PHASE OF FLIGHT

19 ── RETRIEVING RELEVANT COST FUNCTION

21 ── DETERMINING INITIAL POSITION OF EACH SURFACE

22 ── COMPILING LIST OF AERODYNAMIC SURFACE CONFIGURATIONS

32 ── DISPLACING AERODYNAMIC SURFACES TO SURFACE-SPECIFIC POSITIONS OF GIVEN CONFIGURATION INSTANTIATION

33 ── ACQUIRING ACCELERATION DATA

34 ── EVAUATING COST FUNCTION WITH ACQUIRED POSITION AND ACCELERATION DATA

44 ── UNPERFORMED INSTANTIATION

46 ── DISPLACING AERODYNAMIC SURFACES TO SURFACE-SPECIFIC POSITIONS OF OPTIMIZED CONFIGURATION

Fig. 2B

VEHICLE BASED OPTIMIZATION SYSTEM AND METHOD THEREFOR

FIELD OF THE INVENTION

The present invention relates to a vehicular control system, such as an aircraft flight control system or a submarine-based orientation control system. More particularly, the invention relates to a vehicle based optimization system and method therefor.

BACKGROUND OF THE INVENTION

Regarding all types of aircraft, submarines and in all missions, there is a need to find advantageous configurations relating to various positions of movable aerodynamic or hydrodynamic surfaces to effect a desirable use of all available energy resources. Examples of energy resources that are utilized during the mission include chemical energy when controlling fuel consumption, potential energy when controlling altitude or depth, and kinetic energy when controlling vehicle speed.

An aerodynamic or hydrodynamic surface, as referred to herein, means any movable surface which, when moved, will influence a change in the aerodynamic or hydrodynamic forces acting on the vehicle. Traditionally with respect to aircraft, movable surfaces have included ailerons, flaps of all kinds, elevators, rudders, and associated trim tabs. With the advent of unmanned aerial vehicles (UAVs) and unmanned submersibles, such vehicles are now configured with more movable surfaces which can likewise influence the aerodynamic and hydrodynamic forces. These include devices such as movable panels, similar to air brakes, and propellers.

Prior art flight mission control systems operable in conjunction with remotely controlled or autonomous aircraft, including helicopters, fixed-wing or moving-wing planes and multirotor aircraft and submersibles, have dealt with maintaining a balanced vehicle orientation and a desired time of arrival in response to selected inputs, such as pilot inputs.

Heretofore, the movable aerodynamic or hydrodynamic surface positions implemented with respect to prior art mission control systems have been designed for a cruise configuration without taking into account movable surface positions related to cross winds or cross currents, gusts, and nonstandard conditions. Consequently, the accuracy of prior art mission control systems in maintaining a balanced orientation and a desired time of arrival is often compromised by not taking into account one or more of these effects.

Indeed, when flying in a crosswind, whose direction often changes, a prior art control system is intended to maintain stable flight by simply aligning the aircraft to effect a specific flight path using the same control inputs as would exist without the crosswind. In reality, however, the resulting orientation of the aircraft has to be corrected in response to forces applied by the crosswind that causes the aircraft to rotate about the yaw axis and to undergo higher drag since the aerodynamic surfaces were designed assuming zero yaw.

Although these prior art flight control systems are suitable to maintain a balanced flight or a desired time of arrival using logic circuits stored in the aircraft computer, they are incapable of optimizing flight conditions when the aircraft is subjected to increased acceleration or deceleration due to the lack of a compact and accurate accelerometer or gyroscope provided with the aircraft, particularly when the aircraft is a small-sized UAV, e.g. having a weight less than 2.5 kg. Similarly, they are incapable of optimizing flight conditions during periods when the aircraft ordinarily produces changing drag levels since the aircraft is not equipped with a sensor or other means for assessing the level of drag produced by the aircraft.

In recent years it has been established that relying on wing lift for vertical take-off and landing (VTOL) vehicles is much more efficient than on lift generated by rotors. With lift provided by the wings, aircraft generated energy needs to be used only to overcome drag rather than both lift and drag. Therefore, while an aircraft is cruising in a substantially horizontal direction, the lift motors are switched off and their propellers are thus stationary. In many prior art cruising configurations, the major axis or length of the propeller blades is feathered to a stowing angle such that their mid-to-outer section is aligned with the direction of the free stream, which, according to the prevailing understanding, supposedly produces minimum drag as the propeller presents the least head-on area to the free stream flowing across the propeller. Due to the normal twist of a propeller blade, however, some regions of the blade are nevertheless not completely aligned with the free stream and produce more drag than they would if all regions could be aligned with the free stream at the same time.

It is an object of the present invention to provide a vehicular control system that is able to optimize mission conditions smoothly and dynamically.

It is an object of the present invention to provide a vehicular control system that is able to optimize mission conditions when the vehicle is subjected to increased acceleration or deceleration.

It is an object of the present invention to provide a flight control system that is able to optimize flight conditions during periods when an aircraft ordinarily produces changing drag levels.

It is an object of the present invention to provide an aircraft propeller assembly that is able to reduce the drag produced by the aircraft during forward flight relative to prior art practice.

Additional advantages and purposes of the invention will become apparent as the description proceeds.

SUMMARY OF THE INVENTION

A vehicle based optimization system comprises one or more control surfaces movably mounted on a buoyancy-influenced vehicle, said one or more control surfaces being configured to maintain stable vehicular movement through a corresponding medium being navigated by the vehicle; and means for individually, controllably and differentially displacing each of said control surfaces in order to achieve optimum mission conditions.

As referred to herein, a "mission" is a military, commercial, or non-military and non-commercial civilian activity with which the vehicle is involved.

In one aspect, the displacing means comprises an actuator operatively connected to each of the control surfaces which is configured to displace a corresponding control surface to a desired or controlled position that is suitable to achieve the optimum mission conditions.

In one aspect, the displacing means further comprises a position sensor operatively connected to each of the control surfaces which is configured to detect a real-time geometrical position of the corresponding control surface and to output a signal indicative of the detected position; and a processor in data communication with each of the position sensors and actuators, wherein the processor is configured to acquire the signal output from each of the position sensors and to determine thereby an instantaneous position of each of the position sensors and to command one or more of the actuators to displace the corresponding control surface to the controlled position that is suitable to achieve the optimum mission conditions.

In one aspect, the buoyancy-influenced vehicle is an aircraft and the one or more control surfaces are one or more aerodynamic surfaces.

In one aspect, the system further comprises one or more inertial sensors mounted on the aircraft which are in data communication with the processor.

In one aspect, the processor is further configured to retrieve a cost function that is relevant to a current phase of flight and to command one or more of the actuators to displace the corresponding aerodynamic surface to the controlled position until its position conforms to a position dictated by the retrieved cost function.

In one aspect, the cost function is selected from the group consisting of minimum drag, best range, best glide angle, steepest controlled descent, maximizing lift during take-off, and maintaining control of the aircraft during emergency situations.

In one aspect, the plurality of aerodynamic surfaces are selected from the group consisting of aileron, flap, elevator, rudder, trim tab, movable panel, and propeller.

In one aspect, the propeller has one or two blades, and is operable in a vertical flight mode to generate a vertical force and deactivatable during a horizontal flight mode, wherein said propeller is set to a predetermined optimal drag-minimizing stowing angle during the horizontal flight mode which is angularly spaced from a forward direction of flight of the aircraft.

In one aspect, the system further comprises a lift motor controller in data communication with the processor and control circuitry in data communication with the controller, wherein the controller is configured to initiate controlled angular displacement of the propeller in response to an input signal generated by means of the control circuitry.

In one aspect, the buoyancy-influenced vehicle is a watercraft and the one or more control surfaces are one or more hydrodynamic surfaces.

A method for optimizing mission conditions of a vehicle comprises individually, controllably and differentially displacing one or more control surfaces movably mounted on a buoyancy-influenced vehicle and configured to maintain stable vehicular movement through a corresponding medium being navigated by the vehicle until an optimal position for each of the control surfaces that is collectively suitable to achieve optimum mission conditions is established.

In one aspect, the buoyancy-influenced vehicle is an aircraft and the one or more control surfaces are one or more aerodynamic surfaces, the method further comprising the steps of receiving data from each of one or more inertial sensors mounted on the aircraft and from one or more position sensors each of which is operatively connected to a corresponding one of the aerodynamic surfaces; determining a current phase of flight following analysis of the received data; and retrieving a cost function used for optimizing flight conditions that are relevant to the current phase of flight.

In one aspect, the method further comprises the step of inputting the received data to the retrieved cost function to calculate the optimal position of each of the aerodynamic surfaces.

In one aspect, the method further comprises the step of calculating a curve fit for the input data.

In one aspect, the cost function is selected from the group consisting of minimum drag, best range, best glide angle, steepest controlled descent, maximizing lift during take-off, and maintaining control of the aircraft during emergency situations.

In one aspect, the cost function is used for achieving minimum drag and a propeller having one or two blades is displaced to the optimal position for achieving minimum drag, when inactive, by being rotated to an optimal drag-minimizing stowing angle which is angularly spaced from a forward direction of flight of the aircraft.

In one aspect, the method is performed when one or more of the control surfaces is disabled and other control surfaces compensate for the one or more disabled control surfaces while being individually, controllably and differentially displaced until the retrieved cost function is optimized.

A method for reducing drag induced by a propeller of a propeller-bearing aircraft during forward flight comprises rotating a propeller having one or two blades, when inactive, to a predetermined optimal drag-minimizing stowing angle which is angularly spaced from a forward direction of flight of the aircraft.

In one aspect, the propeller is automatically rotated to the optimal stowing angle immediately after the aircraft ceases a vertical flight mode and commences cruising in a horizontal flight mode.

In one aspect, the propeller is manually rotated to the optimal stowing angle from an initial angle.

BRIEF DESCRIPTION OF THE DRAWINGS

In the drawings:

FIG. 2A is a method for optimizing the flight conditions of an aircraft, according to one embodiment;

FIG. 2B is a method for optimizing the flight conditions of an aircraft, according to another embodiment;

DETAILED DESCRIPTION OF THE INVENTION

In a vehicle based optimization system, optimalmission conditions are induced by automatically setting, while a buoyancy-influenced vehicle is in motion and is subjected to mission conditions, the position of each of a selected set of control surfaces, which are instrumental in significantly affecting the forces acting on the vehicle. The control surfaces are movably mounted on the vehicle and are configured to maintain stable vehicular movement through a corresponding medium being navigated by the vehicle.

Although the following description relates to an aircraft and the setting of aerodynamic surfaces to achieve optimal flight conditions, it will be appreciated that the optimization system is likewise suitable to optimize mission conditions for other buoyancy-influenced vehicles such as a watercraft including a boat and a submarine, mutatis mutandis.

An instantaneous combination of a selected set of aerodynamic surfaces and of a geometric position for each aerodynamic surface of the selected set will hereinafter be referred to as the "aerodynamic surface configuration". The set position of each of the aerodynamic surfaces is defined by calculating and optimizing one or more of a plurality of cost functions associated with a current phase of flight that the aircraft is undergoing, such as minimum drag, best range, best glide angle, and steepest controlled descent.

The optimization system is adapted to change the aerodynamic surface configuration in real-time while the flight conditions change, for example from one phase to another. Flight conditions include, speed, altitude, temperature, the presence of precipitation or other types of inclement weather, humidity, cross winds, updrafts and downdrafts, and airborne particles such as aerosols or smoke. For every change in flight condition, there is likely a different aerodynamic surface configuration which will optimize the cost function. It is also possible that the cost function itself could change during the course of the flight.

There is a further need to be able to make adjustments to the movable aerodynamic surfaces in the event of the disablement or loss of function of one or more of the surfaces due to any number of reasons such as in-flight collision, inadvertent mechanical failure, or even pilot error. In such emergency situations, maintaining control of the aircraft is of paramount importance and having done so, it becomes pivotal to conserve fuel, altitude, or other energy source.

Figure 1:
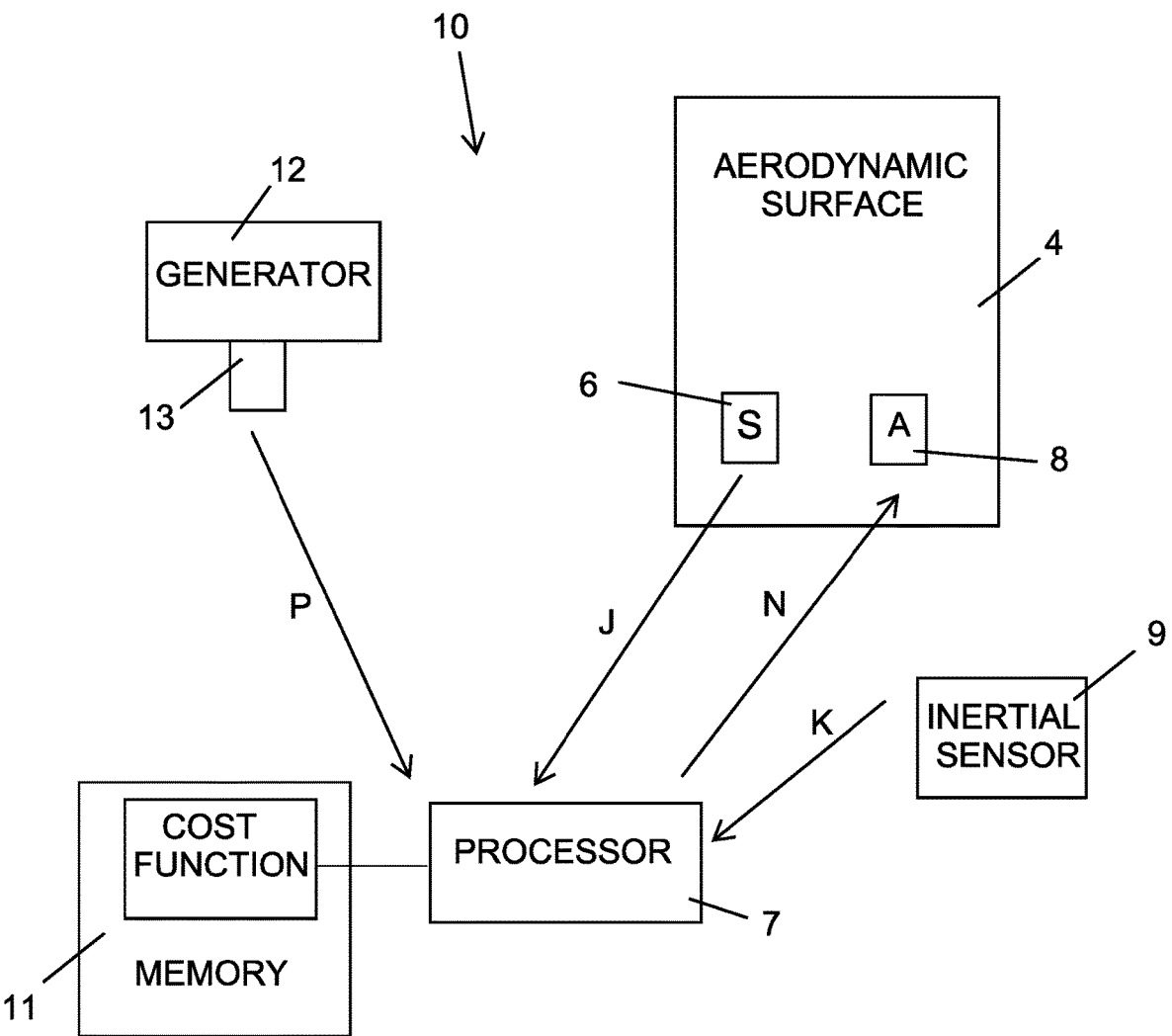
FIG. 1 is a schematic illustration of an embodiment of an aircraft based optimization system.

FIG. 1 schematically illustrates an embodiment of aircraft based optimization system 10. System 10 comprises a plurality of aerodynamic surfaces 4, the number and type of aerodynamic surfaces that are involved in an optimization procedure being selected based on the cost function that is calculated. Each of aerodynamic surfaces 4 has a sensor 6 adapted to detect a real-time geometrical position of the given surface, generally relative to two extreme positions, and an actuator 8 configured to displace the given surface to a desired or controlled position. The geometrical parameter related to the position of the given surface to be controlled may be angle, height, depth, width, or any other suitable parameter. System 10 generally also comprises one or more inertial sensors 9 that are adapted to measure the acceleration and/or angular velocity of the aircraft. To provide an extremely compact configuration onboard the aircraft, each inertial sensor 9 is preferably embodied as a micro-electro-mechanical system (MEMS), which may comprise one or more accelerometers, gyroscopes and magnetic field sensors, for sensing flying characteristics related to roll, pitch and yaw.

A processor 7 is in data communication with each of the sensors 6 and 9, enabling the processor to acquire signals J and K, respectively, from each of the sensors. Processor 7 as well as the entire optimization system is generally mounted onboard the aircraft to facilitate autonomous control; however, embodiments are envisioned whereby the processor is mounted at a ground station remote from the aircraft. Upon synthesizing all of the acquired signals, processor 7 is able to determine the real-time flight conditions of the aircraft that result from the aerodynamic forces acting on the aircraft due to the corresponding geometric position of each of the aerodynamic surfaces 4 and due to the output of the aircraft generator 12 as acquired through generator sensor 13 by signal P, and to ascertain, based on the determined flight conditions, the current phase of flight that the aircraft is undergoing.

Cost Function Evaluation

Once the current phase of flight is known, processor 7 retrieves the cost function relevant to the current phase of flight from memory device 11. Following retrieval of the relevant cost function, the processor selects the aerodynamic surface configuration as well as those sensors that are to be used for the optimization procedure and then calculates the retrieved cost function according to the selected aerodynamic surface configuration. If the calculated cost function indicates a deviation regarding the position of an aerodynamic surface, processor 7 commands operation of the actuator of each of the derivative aerodynamic surfaces through a signal N until their position conforms to the position dictated by the retrieved cost function. The cost function takes into account the collective position of all aerodynamic surfaces of the selected aerodynamic surface configuration, as well as interference, if any, of different surface-derived aerodynamic forces acting on the aircraft. Through the interaction of the feedback provided by system 10, each of the aerodynamic surfaces is controllably and differentially displaceable in order to optimize a relevant cost function, and also to facilitate automated flight control during autonomous flight of the aircraft.

Each of the actuators and sensors preferably has a unique address so that they can be suitably identified and polled by the processor, for use in a subsequent stage of the optimization procedure.

FIG. 2A illustrates a method for optimizing the flight conditions of an aircraft, according to one embodiment.

Firstly, data is received from each of the inertial sensors and aerodynamic surface sensors in step 15, for example by means of wirelessly transmitted signals, and the current phase of flight is determined in step 17 following analysis of the received data. A cost function used for optimizing the flight conditions which is relevant to the current phase of flight is then retrieved in step 19. Following additional analysis of the received data, the initial geometric position of each movable surface of the selected aerodynamic surface configuration is determined in step 21 and an initial aerodynamic surface configuration for use in conjunction with the retrieved cost function is selected in step 23, during flight.

In this embodiment, the selected aerodynamic surface configuration is optimized by a control loop through one or more testing cycles.

For each testing cycle, the following control sequence is performed. Acceleration data from the inertial sensors is acquired in step 25. The acquired position and acceleration data is input to the retrieved cost function so that the cost function will be suitably evaluated in step 26. As a result of the evaluation, an optimal position of each of the movable surfaces of the selected aerodynamic surface configuration is calculated in step 27. If the selected aerodynamic surface configuration is found not to be optimized, one or more additional testing cycles are performed in order to additionally optimize the position of each of the movable surfaces. If the aerodynamic surface configuration is found to be optimized, the flight continues in step 29 according to the optimized aerodynamic surface configuration.

Prior to an additional testing cycle, a different aerodynamic surface configuration is selected by the processor in a subsequent step 23 by commanding one or more actuators to controllably displace the corresponding aerodynamic surfaces to a selected surface-specific position considered to provide a more optimized aerodynamic surface configuration, selecting a different set of aerodynamic surfaces considered to provide a more optimized aerodynamic surface configuration that is to be involved in a testing cycle, or selecting both different surface-specific positions and a different set of aerodynamic surfaces considered to collectively provide a more optimized aerodynamic surface configuration, relative to the previous testing cycle. The other steps 25-27 are then performed in response to the currently selected aerodynamic surface configuration.

According to the context of this embodiment, an aerodynamic surface configuration is found to be optimized by comparing maxima of the cost function of a first testing cycle with corresponding cost function maxima of a second testing cycle, or by comparing minima of the cost function of a first testing cycle with corresponding cost function minima of a second testing cycle. An indication is made that the second testing cycle is optimized if the calculated cost function maxima or minima values of the second testing cycle are more extreme than those of the first testing cycle, but less extreme than those of the third testing cycle, when the first, second and third testing cycles are performed chronologically one after the other.

It is noted that other multivariable optimization methods well known to those skilled in the art may be performed in conjunction with the optimization system of the present invention.

For example with reference to FIG. 2B, after steps 17, 19 and 21 are performed, a list of various aerodynamic surface configurations that are suitable for the retrieved cost function is compiled in step 22. All surface-specific positions are specified for each instantiation of the list, such that the geometric position of one or more given aerodynamic surfaces is displaced by no more than a predetermined value, such as two degrees, between first and second instantiations.

In each testing cycle, aerodynamic surfaces are first displaced to the surface-specific positions corresponding to the aerodynamic surface configuration of a given instantiation in step 32. Acceleration data from the inertial sensors is then acquired in step 33. The acquired position and acceleration data is input to the retrieved cost function so that the cost function will be suitably evaluated in step 34 to output and store a quantified value thereof.

At the end of the testing cycle, a counter circuit increments the list to the next instantiation in step 44 to initiate another testing cycle in accordance with steps 32-34, and likewise to all other instantiations. The counter circuit is capable of quickly incrementing the list even if the number of instantiations is on the order of hundreds or even thousands since the electronic response time of a testing cycle is measured on the order of milliseconds.

When all testing cycles have been performed, the processor determines for which aerodynamic surface configuration the retrieved cost function is optimized by outputting the highest value among all instantiations of the list, and consequently commands the aerodynamic surfaces to be displaced to the surface-specific positions corresponding to the optimized aerodynamic surface configuration in step 46.

The flight then continues according to the optimized aerodynamic surface configuration. The method is repeated throughout the flight to continually provide the optimized cost function, to take into account changing flight conditions, for example due to the presence of cross winds.

During an occurrence of the disablement or loss of function of one or more of the aerodynamic surfaces, such as when the processer fails to receive a response from one of the sensors, the processor commands operation of the actuator of each of the functioning or undamaged aerodynamic surfaces related to the retrieved cost function to compensate for the disabled aerodynamic surfaces. For example, each of the functioning aerodynamic surfaces may be controllably and differentially displaceable by larger increments than the increments to which they are displaced when all relevant aerodynamic surfaces are functioning, until the cost function is optimized. Prior to performing an optimization method when some of the aerodynamic surfaces are disabled, the processor may invoke a dedicated recovery algorithm that urges the aircraft to right itself or to undergo a normative flight procedure.

Although an aircraft cannot fly in completely optimized conditions during a flight, it might attain a higher percentage of optimal flight performance if configured with the aforementioned optimization system, thereby increasing the range, reducing the flight time, reducing the fuel consumed for a given flight, or improving some other cost function.

The optimization system can be in continuous use during flight. Alternatively, the optimization system may be intermittently activated, for example in order to conserve electrical resources, or manually switched on or off. The optimization system should be used whenever there is a change in flight conditions, such as when side winds change direction or airspeed is changed, altitude is changed, or some other flight parameter changes its value.

As may be appreciated from the simplicity of the system, the time for performing a single testing cycle is orders of magnitude shorter than the typical change of flight conditions.

Figure 2C:
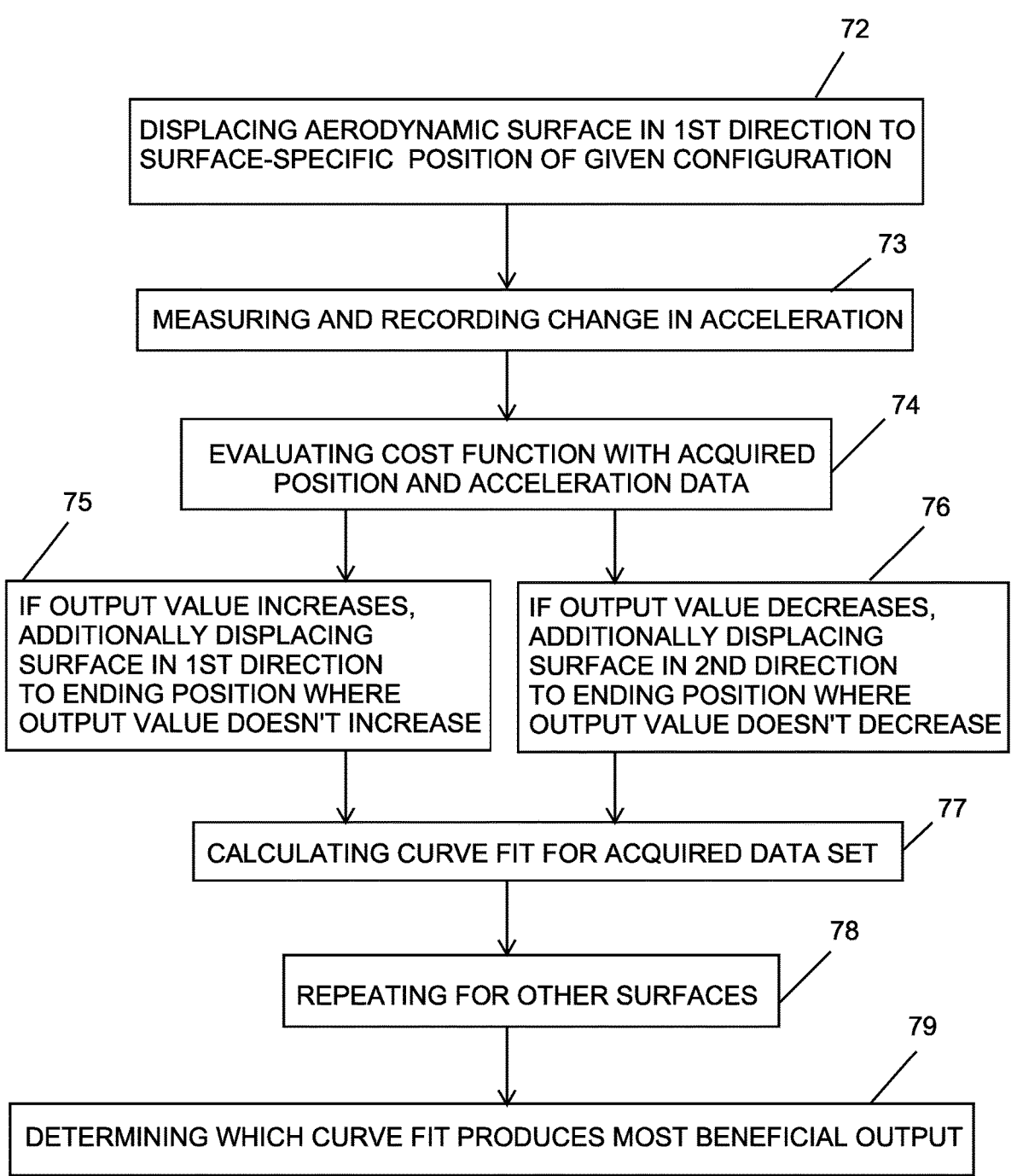
FIG. 2C is a method for optimizing the flight conditions of an aircraft, according to another embodiment.

In the embodiment of FIG. 2C, a retrieved cost function is optimized by additionally performing curve fitting to provide a smooth response curve of function-displacement data sets while ensuring determination of maxima or minima and practically eliminating random sensor error. The following procedure, carried out electronically, may be performed very quickly, usually within a duration of no more than a few seconds.

As described above, after data is received from the sensors and an initial position of each aerodynamic surface is determined, a selected aerodynamic surface is displaced in a first direction to a surface-specific position corresponding to the aerodynamic surface configuration of a given instantiation in step 72. After acceleration data from the onboard accelerometers is acquired, a change in aircraft acceleration is measured and recorded in step 73 for each displacement. For example, a momentary increase in the x-acceleration will indicate a decrease in drag. The acquired position and acceleration data is then input to the retrieved cost function. The retrieved cost function is evaluated in step 74 as to whether the output value increases for the given displacement relative to the output value for the previous aerodynamic surface position. If the output value of the retrieved cost function has been found to increase, the selected aerodynamic surface is additionally displaced in the first direction in step 75 until being displaced to a test cycle ending position for which the output value of the retrieved cost function no longer increases relative to the corresponding output value for the previous position. If the output value of the retrieved cost function has been found to decrease, the selected aerodynamic surface is displaced in the second direction opposite to the first direction in step 76 until being displaced to a test cycle ending position for which the output value of the retrieved cost function no longer decreases relative to the corresponding output value for the previous position. A curve fit for the acquired test cycle position-acceleration data set is calculated and generated in step 77, as well known to those skilled in the art. After the selected aerodynamic surface is then returned to the initial position, step 78 is performed whereby steps 72-77 are repeated for all other aerodynamic surfaces.

In step 79, one curve fit for a corresponding data set is compared to the other curve fits to determine which produces the most beneficial output, i.e. in terms of greater maxima or minima, for the given cost function. Since a single displacement in a small increment will not likely result in the most beneficial output, a sufficient number of curve fits are produced following corresponding aerodynamic surface displacements until no additional improvements to the cost function can be found.

Alternatively, each control surface may be sequentially displaced after having been displaced by one increment. Thus multidimensional data can be acquired. The result is that the optimum will be a combination of displacements that optimize the cost function and the various displacements need to be performed only once.

The optimized aerodynamic surface configuration is the starting position for continued flight in a vertical or horizontal flight mode. When the optimization system is activated, various aerodynamic surfaces are subsequently displaced in order to continue optimizing one or more desired cost functions. In an autonomous flight mode, the aerodynamic surfaces may be displaced relative to the previously optimized aerodynamic surface configuration in order to maintain the aircraft at an altitude, speed, and direction that conform to a desired flight plan.

Figure 3:
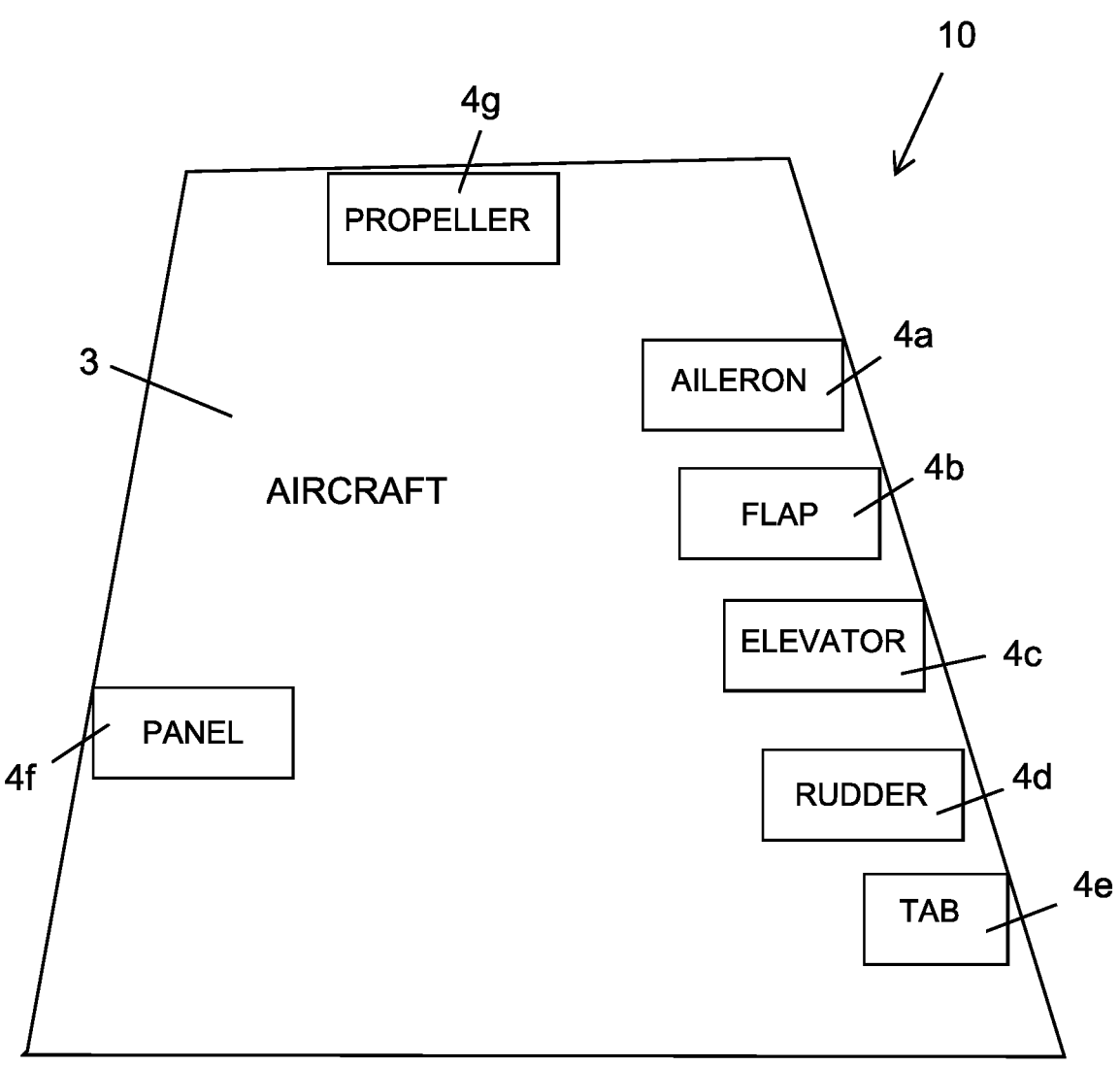
FIG. 3 is a schematic illustration of an aircraft and of aerodynamic surfaces provided therewith.

FIG. 3 schematically illustrates a non-limiting example of aerodynamic surfaces that are able to be used in conjunction with system 10. Aircraft 3 may be configured with one or more of the following aerodynamic surfaces: aileron 4a, flap 4b whether a wing flap or a canard flap, elevator 4c, rudder 4d, trim tab 4e, movable panel 4f, and propeller 4g. Other movable aerodynamic surfaces may include movable panels such as adjustable exhaust vents or wings with adjustable incidence angles, if provided with a fixed-wing aircraft, or the stowing angle of a lift propeller for an Unmanned Aerial Vehicle (UAV). As described above, each of the aerodynamic surfaces is equipped with a corresponding sensor and actuator.

One cost function utilizing the controllably and differentially displaceable aerodynamic surfaces may be used for calculating suitable positions for achieving minimum drag. The output of this cost function may be an aerodynamic surface configuration which results in the lowest power required for a given flight speed, as derived from the output of generator 12 (FIG. 1).

Another cost function that may be employed involves maximizing lift during take-off. Adjusting the positions of the aerodynamic surfaces in the downwash of the propellers, such as the strut flaps, may result in improved lift and hence less power will be needed. This procedure is in contrast to the conventional practice of fully lowering the strut flaps to present less blockage to the rotor downwash. However, full deflection of the strut flaps may not result in the least power required.

A third feasible cost function is related to emergency situations, for example when the loss of the rudder, elevator or pusher motor has been discovered, for which displacement of one or more aerodynamic surfaces will help to maintain control of the aircraft.

It will be appreciated that use of other cost functions or of a combination of cost functions as well is within the scope of the invention.

Although the phase of flight during which one of the cost functions is employed is relatively short, the control sequence described in FIGS. 2A-C for adjusting an aerodynamic surface position is significantly shorter and could be implemented a number of times during the given phase of flight to effect improved power consumption. A significant variable influencing the cost functions is the temporal presence of cross winds, which may affect the value of an optimal flap angle. Since the cost functions take into account cross winds, the optimization system provides an automated way of ensuring that the least power level is used.

In one embodiment, the optimization system is suitable to satisfy more than one cost function at a given time. When there is a close relationship between the different cost functions, the same algorithm as described in one of FIGS. 2A-C may be employed. For two completely different, unrelated cost functions, there would be an added iterative step in which a multivariable Newton iteration, for example, finds the optimal positions of the control surfaces for the two or more cost functions.

One example of simultaneous cost function optimization is minimizing both drag and power consumption. Power is consumed, for example during the burning of fuel or the dissipation of electrical energy, to overcome the drag of a vehicle. While there are other factors that influence the amount of power that is consumed, such as the path followed by the vehicle, these two cost functions may be satisfied at the same time if the vehicle path is preset.

Another example is minimizing both drag and the power level required to sustain the flight. These two cost functions are directly correlated to each other so that minimizing one also minimizes the other. A third example is minimizing both flight time and drag. Reducing drag allows for the vehicle to mission faster for the same power level. To minimize the time of flight, the power level should be set to the highest level suitable for the given altitude. Accordingly, minimizing drag is a prerequisite for flight time minimization.

Setting to Optimal Stowing Angle

Regarding the cost function for achieving minimum drag, it has now been discovered that the drag generated by a propeller bearing aircraft, such as a VTOL aircraft, while cruising in substantially horizontal flight is able to be significantly reduced relative to the prior art practice of aligning the propeller blade with the direction of the free stream or the forward direction of the aircraft, generally corresponding to the direction of the elongated fuselage ("the feathered position").

Wind tunnel tests have shown [Roach, Robert, "Optimum Stowing Angles for Lifting Propellers During Forward Flight," Gadfin Engineering Report E-0001 July 2019] that positioning a propeller blade at an angle significantly different from the feathered position results in a near disappearance of the drag penalty associated with such a propeller blade orientation.

The drag of a cruising aircraft is advantageously able to be reduced by rotating a propeller that is not generating a vertical lift force (hereinafter referred to as an "inactive propeller") by a lift motor to a predetermined drag-minimizing angle relative to the forward direction of the aircraft (hereinafter referred to as the "optimal stowing angle"). During other phases of flight, such as landing, take-off, and hovering, the propeller is active and spinning.

The drag reduction achieved by the present invention, when taking into account each section of the propeller blades from the root to the tip, has surprisingly been found to be much greater than that related to another prior art practice of employing mechanically complicated, pivoting propeller blades that are also configured to reduce drag. While the drag reduction provided by the prior art practice of pivoting the propeller from a deployed position to a stowed position relative to the drag associated with the feathered position is approximately 50%, a drag reduction of approximately 95% is able to be achieved by the present invention when the propeller blades are set at the optimal stowing angle.

Regarding traditional aircraft, it may be that some other combination of aerodynamic surface deflections, including trim tabs, might result in lowered drag. When considering newer flight vehicles, especially UAVs, many non-traditional aerodynamic surfaces are influential in defining flight conditions, particularly cruise conditions. The increased demand for UAVs to have extended ranges and faster cruise speeds is an impetus for determining an efficient orientation of the aerodynamic surfaces. A prime example is the stowed propeller blades of a hybrid UAV having lifting rotors which are turned off during forward flight while lift is generated by the wings. The propellers represent a movable surface exposed to the free stream and whose orientation can greatly affect the lift and drag. In this embodiment, the optimization system is configured to change the blade orientation during flight in real-time to an angle determined to induce a minimum value of drag. This determined drag-minimizing angle often changes periodically or intermittently as the direction of the cross wind changes. Feedback from on-board accelerometers, now common in UAVs, allows a rapid determination of these blade angles. The scope of the invention includes a generic optimization system and method that are suitable for all types of aircraft and all movable aerodynamic surfaces, not just control surfaces.

Figure 4:
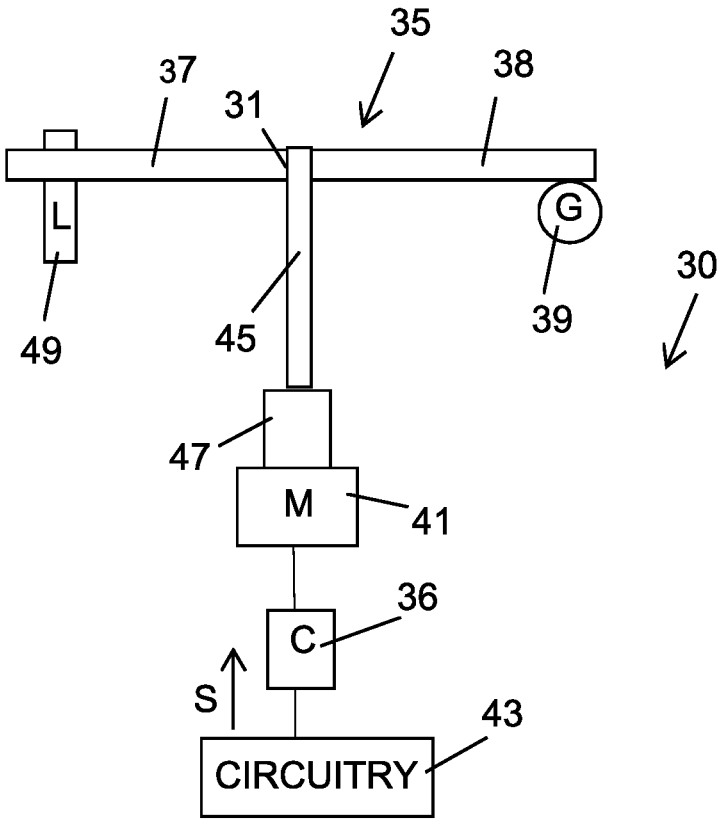
FIG. 4 is a schematic illustration in side view of an embodiment of an aircraft propeller assembly.

FIG. 4 schematically illustrates an aircraft propeller assembly 30 having a propeller 35 that is suitable to be set to the optimal stowing angle. Each propeller 35 of the aircraft, which is generally a VTOL aircraft, is in substantially continuous operation only during a vertical flight mode for take-off and landing to generate a vertical force, and is deactivated during the horizontal flight mode. When inactive, the propeller blades are set to the optimal stowing angle during the horizontal flight mode.

Propeller 35 is shown to be two-bladed having two blades 37 and 38 with a fixed pitch, or angle of attack; however, it is also suitable for use with a single blade or with a variable-pitch assembly. The shaft 45 which is rotatably driven by the lift motor 41, which is generally an electric motor, to cause rotation of propeller 35 and is in engagement with hub 31 being centrally located with respect to the two blades 37 and 38, and one or more reduction gearing units 47 may be used to reduce the rotational speed of shaft 45. Each of blades 37 and 38 may be made of a composite material, a plastic material, a wood material, or a combination thereof, and may have a positive camber to produce lift when it is desired that the aircraft will undergo vertical flight. Shaft 45 may be made of a metal material or of a composite material.

The operation of lift motor 41 is controlled by controller 36, which may receive an input signal S generated by means of control circuitry 43 from an operator located within the aircraft, from an operator located remotely with respect to the aircraft, or from an autonomous flight management system in conjunction with a desired flight plan. Controller 36 in turn is in data communication with processor 7 (FIG. 1). The current angle of a propeller blade relative to the forward flying direction is able to be determined by a gauge 39, which may be a needle-type gauge viewable by the operator, a digital type gauge, a magnetic type gauge, or an encoder for measuring the angular displacement of the rotor of lift motor 41 or of shaft 45 kinematically connected to the rotor. Through the interaction of gauge 39 and control circuitry 43, propeller 35 may be angularly displaced accurately from an instantaneous inactive angle to the optimal stowing angle, whether through the intervention of the operator or through automatic control. For example, the propeller may be set to the optimal stowing angle by automatic control immediately after the aircraft ceases the vertical flight mode and commences cruising in the horizontal flight mode.

After propeller 35 is angularly displaced to the optimal stowing angle, it may be locked in place by locking means 49 when the aircraft is cruising in the horizontal flight mode. Locking means 49 may be the means described in the copending application by the same Applicant and bearing Docket No. 40070/IL/20-ORP, or any other suitable locking means or locking mechanism. An electromechanical locking means 49 may be activated by an actuator, which may be in electrical communication with controller 36. Alternatively, locking means is manually set by the operator.

These steps may be reversed in whole or in part when the aircraft ceases the horizontal flight mode and commences the vertical flight mode.

Each propeller 35 may be locked temporarily. Also, the corresponding locking means 49 facilitates the achievement of locking the propeller at different stowing angles so that the aforementioned optimization method may take place in real-time as flight conditions, particularly cross winds, change.

Figure 5:
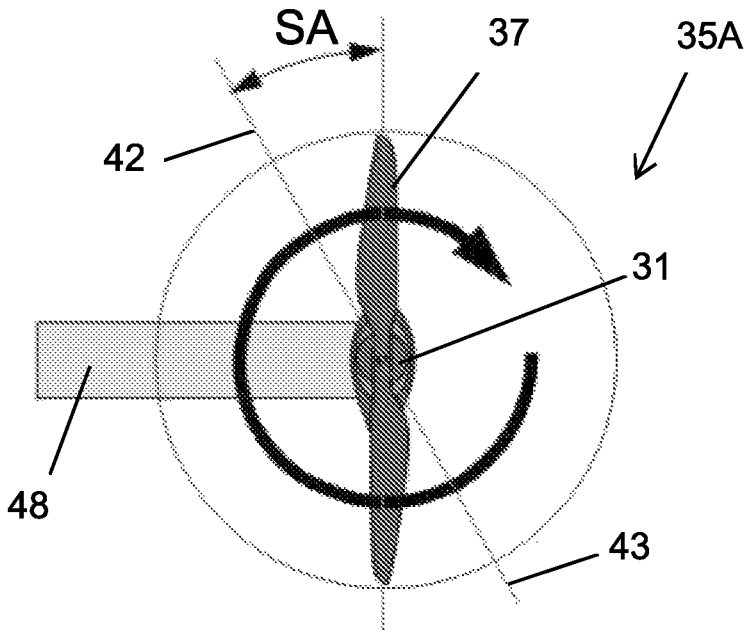
FIG. 5 is a schematic illustration in top view of a clockwise rotating propeller operable in conjunction with the assembly of FIG. 4.

FIG. 5 schematically illustrates clockwise rotating propeller 35A mounted on arm 48 of the aircraft, when set to optimal stowing angle SA according to a toe-in configuration whereby forward blade 37 of the propeller is rotated toward line 42 being parallel to the fuselage of the aircraft and of the forward direction of flight. As shown, optimal stowing angle SA is defined between lines 42 and 43, both of which coinciding with the shaft mounted in hub 31. Line 43 extends through the midline of propeller blades 37 and 38. Propeller 35A is associated with the apparatus of propeller assembly 30 described in FIG. 4 according to any of the embodiments.

Figure 6:
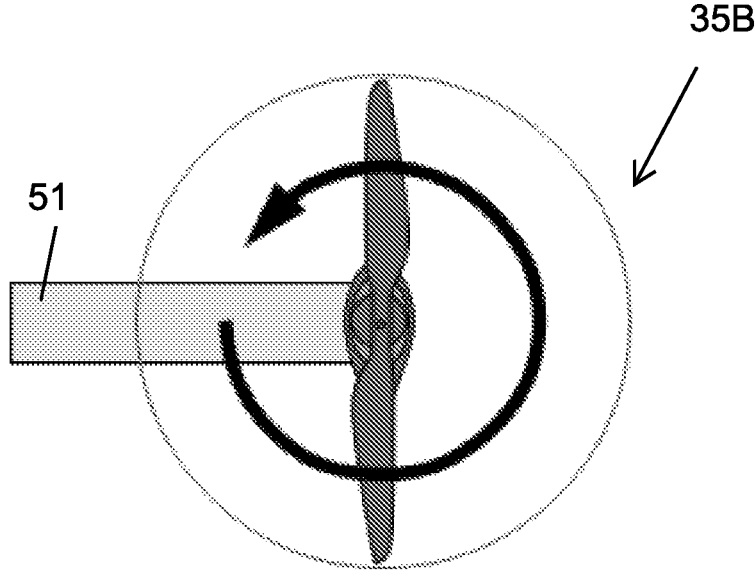
FIG. 6 is a schematic illustration in top view of a counterclockwise rotating propeller operable in conjunction with the assembly of FIG. 4.

FIG. 6 similarly schematically illustrates counterclockwise rotating propeller 35B mounted on arm 51 of the aircraft when set to an optimal stowing angle. Clockwise and counterclockwise rotations are defined with respect to the given orientation. Horizontal forces to which the aircraft are subjected are able to be controlled when both clockwise and counterclockwise propellers 35A-B are rotatably driven.

The following illustrative and non-limiting example is provided for a better understanding of the propeller assembly.

Example 1

Figures 7, 8:
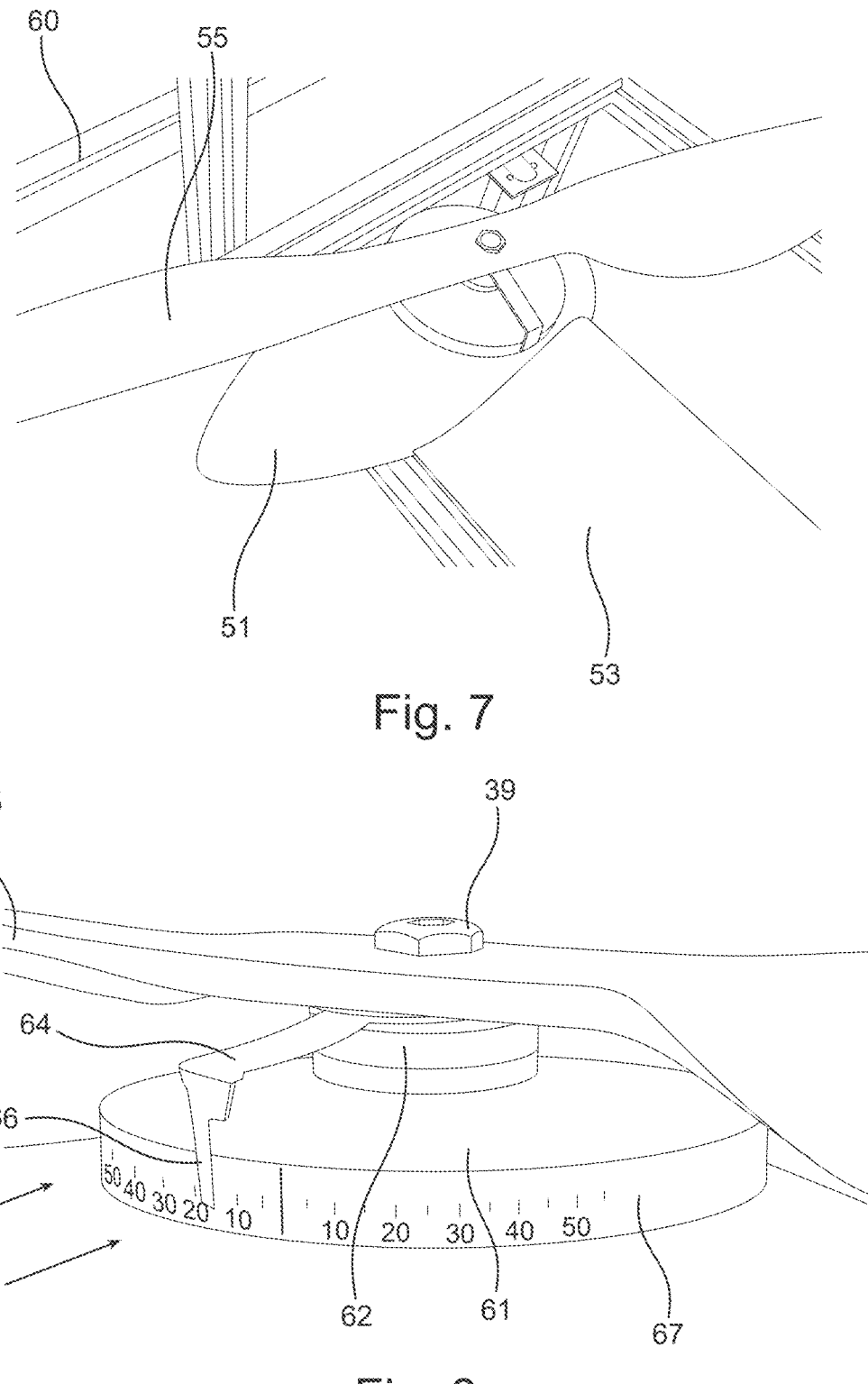
FIG. 7 is a perspective top view of test apparatus.
FIG. 8 is a perspective view of an angle gauge used in conjunction with the test apparatus of FIG. 7.

The propeller 55 mounted on a single full-size strut 53 shown in FIG. 7 of a Gadfin Spirit 1 VTOL aircraft was tested during July 2019 within a low-speed wind tunnel 60 at Afeka College, Tel Aviv, Israel in order to determine an optimal stowing angle. Propeller 55 had a diameter of 29 in (73.66 cm) and was similar to either propeller 35A or propeller 35B. Wind tunnel 60 had a cross-sectional area of 50×50 cm, and a blower provided therewith was capable of emitting air at speeds of up to 60 m/sec. The VTOL aircraft from which the strut was taken was designed for cruising at a speed of around 30 m/sec, and had four propellers, and a single, smaller pusher motor.

Propeller 55 was mounted on a pod 51, which was connected to strut 53. Strut 53 in turn was fitted with an attachment to a force balance positioned externally to wind tunnel 60. A physical limitation of the test apparatus was that propeller 55 had a larger diameter than the cross section of wind tunnel 60, and therefore, due to the central location of pod 51 within the wind tunnel, each stowing angle that was able to be tested was limited to ±40°.

The stowing angle to be tested was set by the angle gauge 65 shown in FIG. 8. Angle gauge 65, which was positioned between propeller 55 and pod 51, included a circular disk 61 fixed to the pod. A bearing 62 in which was rotatably mounted a vertical shaft connected to a hub 59 of propeller 55 was provided at the center of disk 61. A horizontal arm 64 attached to the shaft terminated with a narrow, downwardly extending finger indicator 66 that was adapted to be aligned with a mark of a 360-angle scale 67 imprinted on the sidewall of disk 61 helping to make an angle measurement in increments of 5°, to indicate the current angle of the midline of the blades of propeller 55.

The wind tunnel blower was set to emit air at a velocity of 28 m/sec (100.8 km/hr). For each test, the current angle of the propeller blades with respect to the direction of the emitted air was manually varied by increments of 10 degrees from an angle of –20 degrees to +40 degree as indicated in FIGS. 9-12, for both clockwise (CW) and counterclockwise (CW) propellers. Also, the angle of attack (a) of the propeller was varied from –6 to +10 degrees, at increments of 2 degrees.

During flow of air within the wind tunnel, a transducer provided with the force balance converted a horizontal load applied onto the force balance, which is representative of drag, into an electrical signal. The voltage Vx of the electrical signal was measured. Due to the test setup of the force balance, voltage Vx was linearly proportional to the actual drag so that a minimum voltage value corresponded to minimum drag.

The voltage measurement was registered on each graph of FIGS. 9-12 for the various propeller blade and angle of attack angles, and a different symbol was assigned for each angle of attack. Since a smooth curve without sharp fluctuations was able to be traced between adjacent voltage points for all voltage points of a given angle of attack, these graphs are indicative that a correlation can be made between blade-induced drag and stowing angle.

Figures 9, 10:
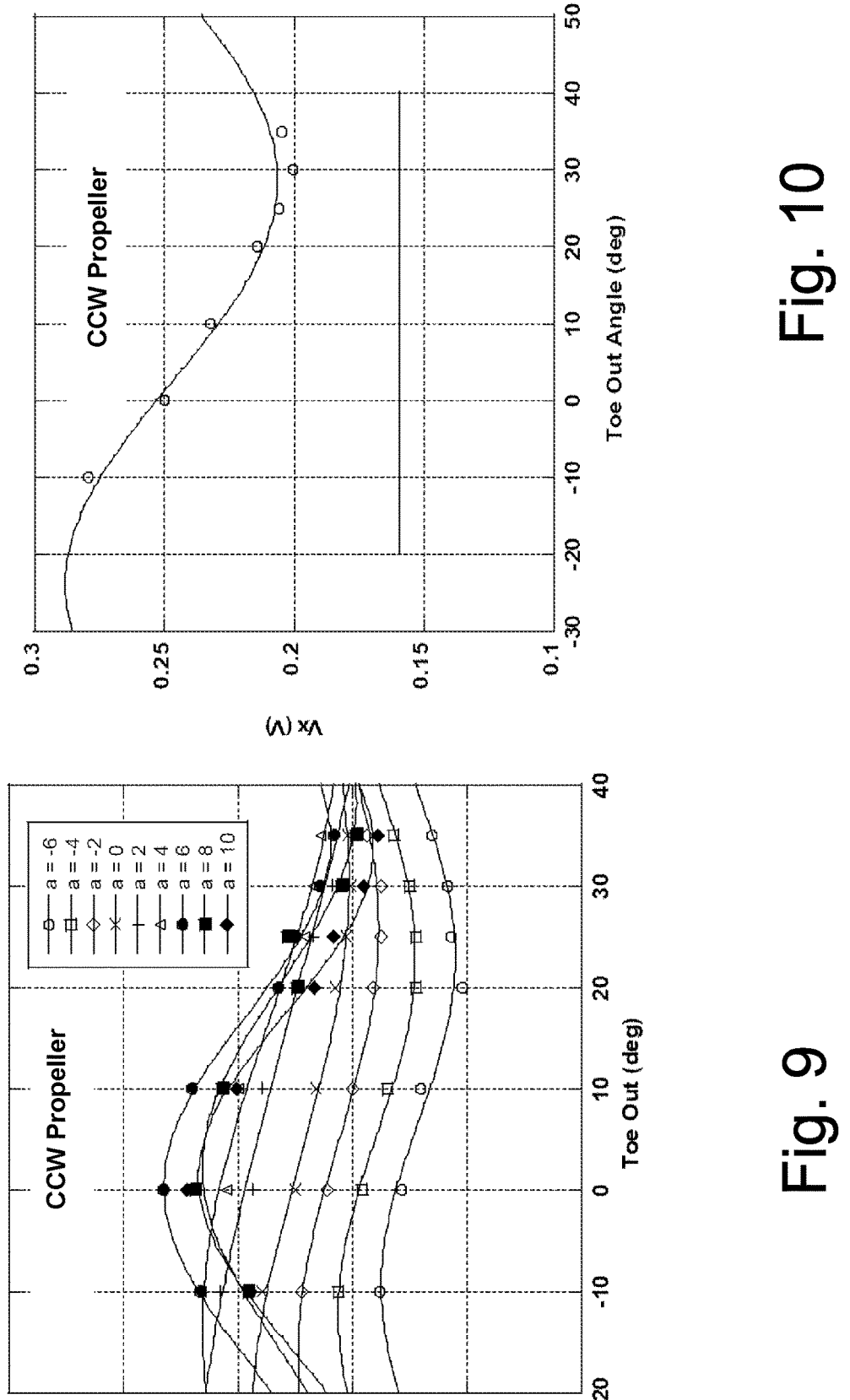
FIG. 9 is a graph of voltage measurements made with the test apparatus of FIG. 7 and a first counterclockwise rotating propeller, showing a plurality of curves each of which generated from adjacent voltage points for all voltage points of a corresponding angle of attack by which the first counterclockwise propeller was positioned.
FIG. 10 is a larger scale of one of the curves of FIG. 9.
Figure 12:
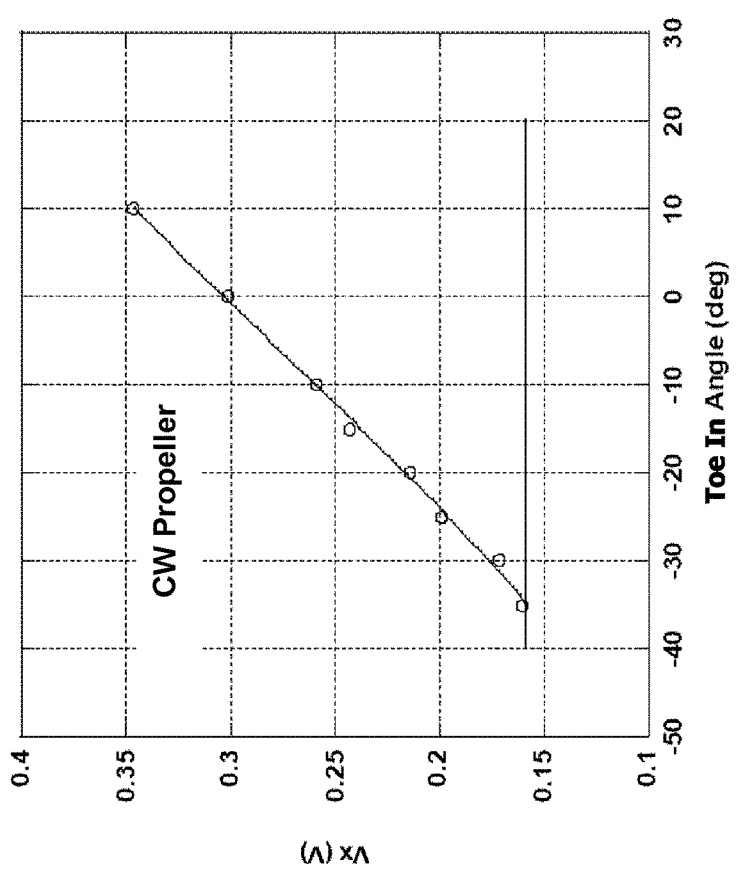
FIG. 12 is a larger scale of one of the curves of FIG. 11.
Figure 11:
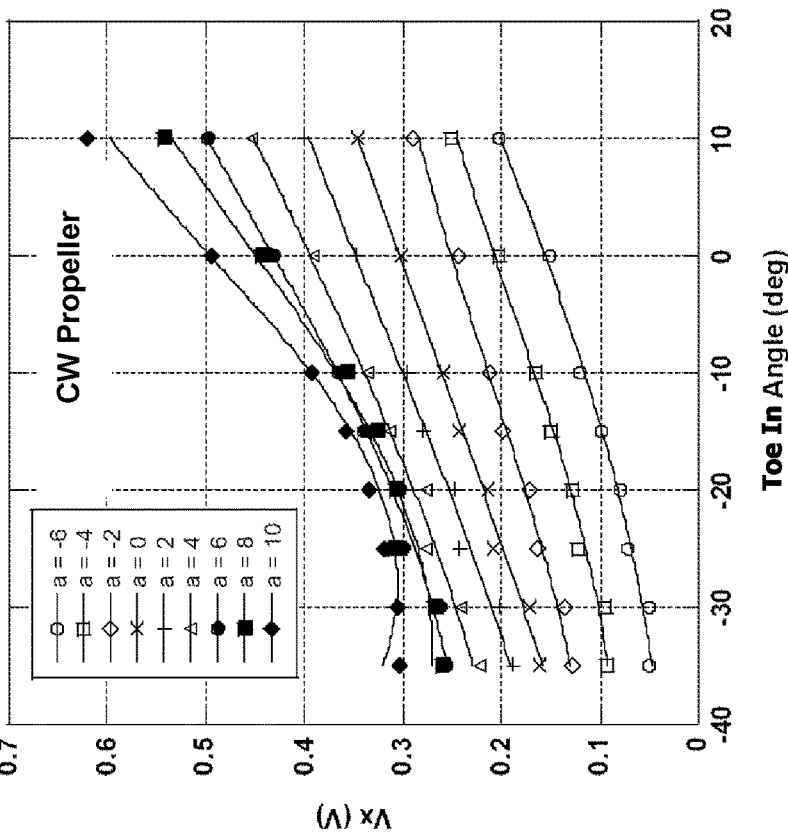
FIG. 11 is a graph of voltage measurements made with the test apparatus of FIG. 7 and a first clockwise rotating propeller, showing a plurality of curves each of which generated from adjacent voltage points for all voltage points of a corresponding angle of attack by which the first clockwise propeller was positioned.

It therefore follows from the lowest-value voltage measurements made in FIGS. 9 and 10 for the CCW propeller with respect to toe-out angles, the optimal stowing angle is 30 degrees. Also, the lowest-value voltage measurements made in FIGS. 11 and 12 for the CW propeller with respect to toe-in angles, the optimal stowing angle is 35 degrees.

It is evident from these test results that significant drag reduction is able to be achieved while cruising in substantially horizontal flight by setting the lift propellers to a propeller-specific stowing angle. An optimal stowing angle ranging from 25-30 degrees will be able to minimize drag at different angles of attack during substantially horizontal flight and for propellers having a diameter ranging from 10-35 inches.

It is understood that the optimal stowing angle determined by the above test program is valid only for the strut, motor housing, and propeller combination tested. Different test setups may result in different optimal stowing angles for zero cross wind.

An aircraft whose propellers are set to the optimal stowing angle while cruising will accordingly be afforded good stability. As a result in perturbations which cause changes in the angle of attack the propeller-induced drag will be slightly lower, helping to offset increased drag that is induced from other components.

The following three illustrative and non-limiting examples demonstrate ways how an optimization method according to any of the previously described embodiments is able to be implemented to optimize a flight configuration. As the various possibilities for optimizing a flight configuration are numerous and the corresponding calculations are complex, the supporting calculations have not been provided so as not to unduly burden the reader.

Example 2

Reducing Drag by Adjusting the Lift Propeller Angle to Reduce Fuel Consumed During Flight After a UAV has reached cruise conditions and the lift propellers have been deactivated and set at the previously determined optimal drag-minimizing stowing angle, the only movable surfaces that are needed to be displaced for optimization purposes are the lift propellers and the required displacement is angular displacement. When the lift propellers are displaced to positions of a given configuration instantiation, the two front propellers are simultaneously displaced in opposite rotational directions, while a pair of front and corresponding rear propellers are also set to a counter-rotating arrangement to avoid development of yaw. If the UAV is nevertheless subjected to yaw, the processor is able to simply calculate the relative angular displacement that should be effected between the two propellers to produce a compensating moment that cancels the influence of the yaw moment.

When the cruising UAV set to optimized aerodynamic surface configuration changes course in flight and thus the crosswinds change direction or accesses an area where the winds blow in a different direction, the propellers are no longer positioned at the optimal stowing angle and drag increases. The optimization system then performs the steps outlined above, while acceleration data is immediately available to determine whether a change in propeller angle is advantageous and produces lower drag, until the optimal stowing angle is found. The UAV is consequently returned to an optimized state with a newly determined optimized aerodynamic surface configuration and with a reduction in drag.

Example 3

Reducing Drag to Increase Range by Adjusting Movable Surfaces

A maximum flight range may be achieved when the aircraft is set at a maximum lift/drag ratio.

The optimum pitch angle for an aircraft in flight is a balance between the angle of attack required by the lifting surfaces and the weight of the aircraft. On traditional aircraft with only the wing and horizontal tail for lift surfaces, the optimum configuration is generally thought to be achieved with vehicle angle of attack (pitch angle) such that the lift exactly balances the weight with no flap deflection. The elevator is used to set the angle of attack for cruise and the elevator angle held in place by the trim tabs.

On more complex aircraft, such as those with canards, forward lifting struts, chines with movable surfaces, or aircraft with other moving surfaces than the traditional ones, there are more options. For example, some aircraft have three lifting surfaces-a lifting forward strut for the front lift motors, the main wing, and the rear strut for the rear motors, which acts as a horizontal tail and whose flap acts as the elevator. The front strut aerodynamics affects the downstream main wing and the main wing aerodynamics affects the rear strut. By adjusting the flap angle of the forward strut (up or down), its lift changes. This affects the lift required by the main wing and the rear strut and hence the angle of attack of the vehicle. There is a range of front strut flap angles at which level flight may be achieved, but there is one angle at which the drag is minimum. It is now possible to find this angle with the optimization system by relying on one of the algorithms described above to set an angle of the front strut flap.

Example 4

Optimizing Aircraft Configuration with a Change in Dynamic Pressure

Dynamic pressure changes with a change of flight speed, or a change in air density, the latter resulting from a change in altitude. Thus, aircraft are optimally designed for a range of flight altitudes and airspeeds. As cruise altitude changes, a different velocity is selected to maintain the dynamic pressure. Alternatively, the pitch of the aircraft is adjusted, such that the pitch is typically higher, for example, at lower speeds. The disadvantage of maintaining level flight using aircraft pitch is that the fuselage and other non-lifting surfaces produce a different amount of drag, usually higher, if not at the designed angle of attack, thereby limiting the altitude and speed range of the aircraft.

With more complex aircraft, such as described above, there is a combination of flight configurations that will allow a minimization of drag at a much larger range of speed and altitude. One of the algorithms described above may be used for the optimization of the flight surfaces by displacing the lift and pitch changing control surfaces of the lifting components.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A vehicle based optimization system, comprising: a) two or more control surfaces including an inactive propeller that are movably mounted on a buoyancy-influenced vehicle, said two or more control surfaces being configured to maintain stable vehicular movement through a corresponding medium being navigated by the vehicle that conforms to a predetermined movement plan, such that the vehicle will be returned to movement that conforms to the predetermined movement plan after being subjected to perturbations that caused a momentary deviation from the predetermined movement plan; and b) means for individually, controllably and differentially displacing each of said control surfaces including the inactive propeller in order to achieve optimum mission conditions.

2. The optimization system according to claim 1, wherein the displacing means comprises an actuator operatively connected to each of the control surfaces which is configured to displace a corresponding control surface to a desired or controlled position that is suitable to achieve the optimum mission conditions.

3. The optimization system according to claim 2, wherein the displacing means further comprises:
   i) a position sensor operatively connected to each of the control surfaces which is configured to detect a real-time geometrical position of the corresponding control surface and to output a signal indicative of the detected position; and
   ii) a processor in data communication with each of the position sensors and actuators, wherein the processor is configured to acquire the signal output from each of the position sensors and to determine thereby an instantaneous position of each of the position sensors and to command one or more of the actuators to displace the corresponding control surface to the controlled position that is suitable to achieve the optimum mission conditions.

4. The optimization system according to claim 3, wherein the buoyancy-influenced vehicle is an aircraft and the one or more control surfaces are one or more aerodynamic surfaces.

5. The optimization system according to claim 4, wherein the processor is further configured to retrieve a cost function that is relevant to a current phase of flight and to command one or more of the actuators to displace the corresponding aerodynamic surface to the controlled position until its position conforms to a position dictated by the retrieved cost function.

6. The optimization system according to claim 5, wherein the cost function is selected from the group consisting of minimum drag, maximum best range when the aircraft is set at a maximum lift/drag ratio, optimal power-off pitch angle to achieve maximum range prior to touchdown, steepest controlled descent, maximizing lift during take-off, and maintaining control of the aircraft during emergency situations.

7. The optimization system according to claim 4, wherein the plurality of aerodynamic surfaces are selected from the group consisting of aileron, flap, elevator, rudder, trim tab, movable panel, and inactive propeller.

8. The optimization system according to claim 7, wherein the propeller has one or two blades, and is operable in a vertical flight mode to generate a vertical force and is deactivatable during a horizontal flight mode, wherein said propeller is settable to a predetermined optimal drag-minimizing stowing angle during the horizontal flight mode which is angularly spaced from a forward direction of flight of the aircraft.

9. The optimization system according to claim 8, further comprising:

a) means for controllably displacing the propeller to the optimal stowing angle; or b) a gauge for measuring angular displacement of the propeller from an initial angle relative to the forward direction of flight to the optimal stowing angle; or c) a lift motor controller in data communication with the processor and control circuitry in data communication with the controller, wherein the controller is configured to initiate controlled angular displacement of the propeller in response to an input signal generated by means of the control circuitry; or d) locking means for locking the propeller at the optimal stowing angle.

10. The optimization system according to claim 9, wherein the propeller displacing means comprises a lift motor configured to generate the vertical force during the vertical flight mode and a shaft rotatably driven by the lift motor and in engagement with the propeller, the lift motor being operable for a specific duration suitable for angularly displacing the propeller from the initial angle to the optimal stowing angle.

11. The optimization system according to claim 10, further comprising one or more reduction gearing units adapted to reduce a rotational speed of the shaft.

12. The optimization system according to claim 4, further comprising one or more inertial sensors mounted on the aircraft which are in data communication with the processor.

13. The optimization system according to claim 1, wherein the buoyancy-influenced vehicle is a watercraft and the one or more control surfaces are one or more hydrodynamic surfaces.

14. A method for optimizing mission conditions of a vehicle, comprising individually, controllably and differentially displacing two or more control surfaces including an inactive propeller that are movably mounted on a buoyancy-influenced vehicle and configured to maintain stable vehicular movement through a corresponding medium being navigated by the vehicle until an optimal position for each of the control surfaces including the inactive propeller that is collectively suitable to achieve optimum mission conditions is established, wherein said two or more control surfaces including the inactive propeller maintain stable vehicular movement through a corresponding medium being navigated by the vehicle that conforms to a predetermined movement plan, such that the vehicle will be returned to movement that conforms to the predetermined movement plan after being subjected to perturbations that caused a momentary deviation from the predetermined movement plan.

15. The method according to claim 14, wherein the buoyancy-influenced vehicle is an aircraft and the one or more control surfaces are one or more aerodynamic surfaces, the method further comprising the steps of:

a) receiving data from each of one or more inertial sensors mounted on the aircraft and from one or more position sensors each of which is operatively connected to a corresponding one of the aerodynamic surfaces;

b) determining a current phase of flight following analysis of the received data; and c) retrieving a cost function used for optimizing flight conditions that are relevant to the current phase of flight.

16. The method according to claim 15, further comprising the step of:

inputting the received data to the retrieved cost function to calculate the optimal position of each of the aerodynamic surfaces; or calculating a curve fit for the input data.

17. The method according to claim 15, wherein the cost function is:

selected from the group consisting of minimum drag, maximum range when the aircraft is set at a maximum lift/drag ratio, optimal power-off pitch angle to achieve maximum range prior to touchdown, steepest controlled descent, maximizing lift during take-off, and maintaining control of the aircraft during emergency situations; or used for achieving minimum drag and a propeller having one or two blades is displaced to the optimal position for achieving minimum drag, when inactive, by being rotated to an optimal drag-minimizing stowing angle which is angularly spaced from a forward direction of flight of the aircraft.

18. The method according to claim 15, which is performed when one or more of the control surfaces is disabled and other control surfaces compensate for the one or more disabled control surfaces while being individually, controllably and differentially displaced until the retrieved cost function is optimized.

19. A method for reducing drag induced by a propeller of a propeller-bearing aircraft during forward flight, comprising i) rotating a propeller having one or two blades, when inactive, to an optimal drag-minimizing stowing angle which is angularly spaced from a forward direction of flight of the aircraft; ii) determining a change in flight conditions of the aircraft upon receiving data transmitted from a plurality of sensors mounted on the aircraft; iii) calculating, by a processor receiving the transmitted data, an optimal position for each of a plurality of movably mounted aerodynamic control surface of the aircraft including the propeller, in response to the changed flight conditions to achieve minimum drag; and iv) commanding, by the processor, each of the plurality of aerodynamic surfaces to be displaced to surface-specific positions corresponding to the calculated optimal positions, so that the flight will continue according to the surface-specific positions, wherein the surface-specific position to which the inactive propeller is displaced in response to the changed flight conditions is another optimal stowing angle which is angularly spaced from the forward direction of flight of the aircraft.

20. The method according to claim 19, wherein the propeller is:

a) automatically rotated to the optimal stowing angle from an initial angle; or b) automatically rotated to the optimal stowing angle immediately after the aircraft ceases a vertical flight mode and commences cruising in a horizontal flight mode; or c) manually rotated to the optimal stowing angle from an initial angle.

* * * * *